United States Patent [19]

Shomer

[11] 4,444,149
[45] Apr. 24, 1984

[54] POULTRY WATERING DEVICE

[75] Inventor: Yair Shomer, DN Menashe, Israel

[73] Assignee: Plasson Maagan Michael Industries Ltd., Menashe, Israel

[21] Appl. No.: 336,830

[22] Filed: Jan. 4, 1982

[30] Foreign Application Priority Data

Jan. 16, 1981 [IL] Israel ............................................. 61915
Dec. 10, 1981 [IL] Israel ............................................. 64499

[51] Int. Cl.³ ........................... A01K 7/06; A01K 39/02
[52] U.S. Cl. ......................................... 119/18; 119/75
[58] Field of Search ................................. 119/75, 18, 72

[56] References Cited

U.S. PATENT DOCUMENTS

| 1,646,246 | 10/1927 | Hazard | 119/75 |
|---|---|---|---|
| 2,514,491 | 7/1950 | Hay et al. | 119/72 X |
| 3,520,281 | 7/1970 | Hart | 119/75 |
| 3,648,663 | 3/1972 | Kofford | 119/75 |
| 3,952,706 | 4/1976 | Hart | 119/75 |
| 4,157,697 | 6/1979 | Neher | 119/75 |
| 4,248,178 | 2/1981 | Kneubuehl | 119/75 |
| 4,282,831 | 8/1981 | Nilsen | 119/75 |
| 4,307,682 | 12/1981 | Bollman | 119/75 |

FOREIGN PATENT DOCUMENTS 863962  3/1961  United Kingdom ................. 119/72

Primary Examiner—Hugh R. Chamblee
Attorney, Agent, or Firm—Benjamin J. Barish

[57] ABSTRACT

A poultry watering device is described connectable to a water supply line and including an open-top cup receiving water from the supply line, a valve assembly having a valve operator disposed within the cup and controlling a valve member for periodically admitting water into the cup from the water supply line, and mounting means for mounting the device to a support with the cup positioned to permit the poultry to drink water from the cup through the open top thereof. A wall of the cup is extended outwardly to form a sleeve whose interior communicates with the interior of the cup. The valve assembly includes an outer valve body received within the sleeve with the valve operator disposed within the cup, such that the cup may be removed from the outer valve body without shutting-off the water supply or disconnecting the valve assembly from the water supply line.

9 Claims, 8 Drawing Figures

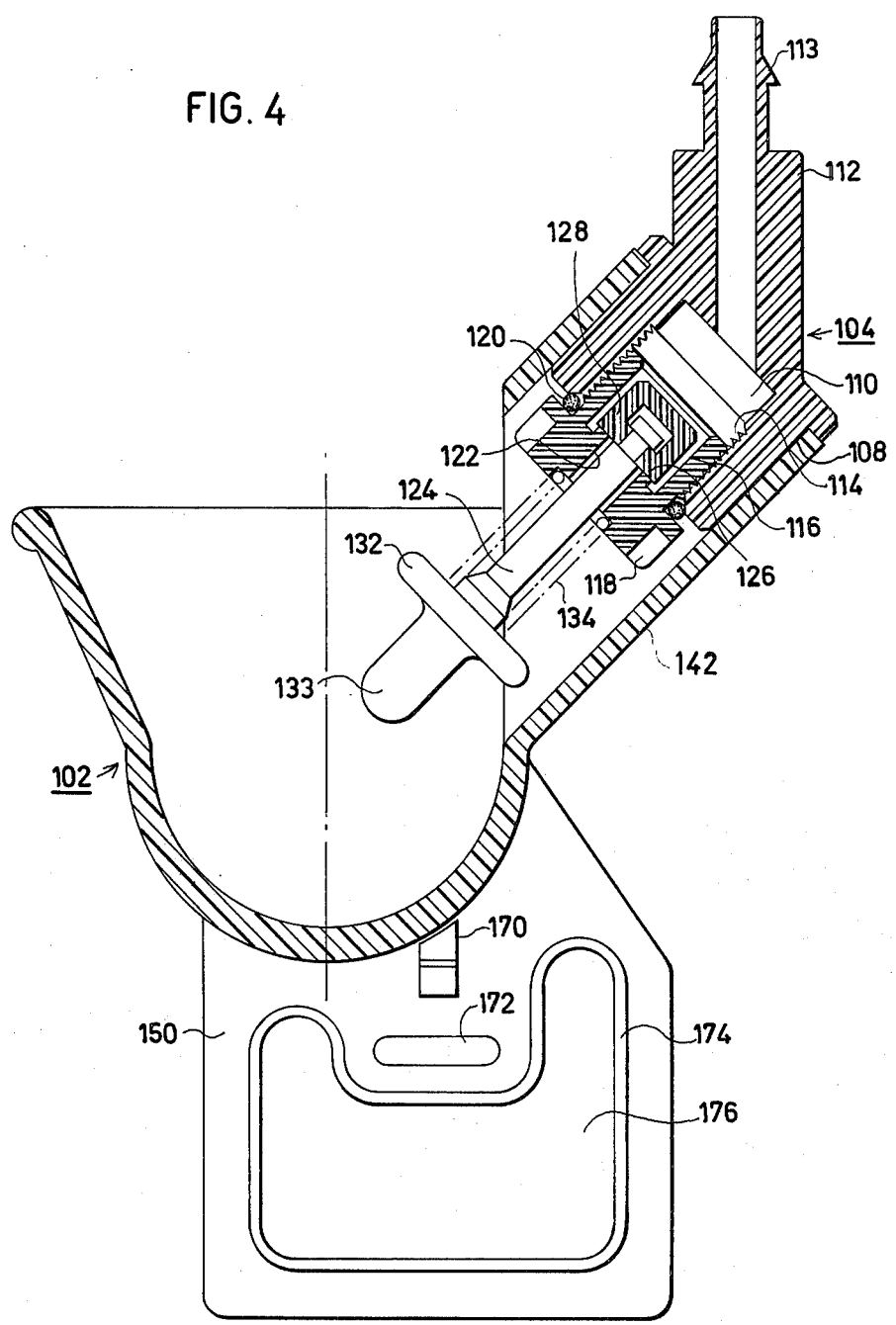

POULTRY WATERING DEVICE

BACKGROUND OF THE INVENTION

The present invention relates to poultry watering devices, and particularly to the type including a cup attachable to poultry cages and including a valve assembly operable to continuously replenish the cup with water as the poultry drink from the cup.

Various types of such poultry watering devices are known. In one type, the cup includes a float-operated valve for continuously replenishing the cup with water. Another type includes a valve operator which is contacted by the poultry when drinking from the cup for opening the valve to replenish the cup with water. The invention is particularly useful with respect to the latter type of device, and it is therefore described below with respect to this application but it will be appreciated that the invention could be advantageously used in other applications as well.

The poultry-actuated type of watering devices includes an open-top cup receiving water from the supply line, a valve assembly having a valve operator disposed within the cup and controlling a valve member for periodically admitting water into the cup from the water supply line, and mounting means for mounting the device to a support with the cup positioned to permit the poultry to drink water from the cup through the open top thereof, the valve operator being contacted by the poultry while drinking from the cup and thereby periodically admitting water into the cup.

An object of the present invention is to provide a number of improvements in such poultry watering devices, as will be described more particularly below.

BRIEF SUMMARY OF THE INVENTION

According to one aspect of the present invention, the valve assembly comprises a valve body and a cap removably attached to the valve body and formed with an aperture therethrough. The inner face of the cap disposed within the valve body carries an annular valve seat completely circumscribing the aperture, and the valve operator includes a stem extending through the aperture of the cap. The valve member is carried at the inner end of the stem within the valve housing adjacent to the valve seat. The valve stem is of sufficiently smaller cross-sectional area than the aperture in the cap so as to permit tilting of the valve stem within the aperture to unseat the valve member from a portion of the annular valve seat and to provide a flow pathway around the stem when the stem is so tilted. The valve assembly further includes a spring urging the stem outwardly to bias the stem to its untilted position with the valve member in engagement with the complete annular surface of the valve seat.

According to a further feature, the stem is formed at its outer end with an annular projection which serves as a shoulder for receiving the spring between it and the cap, as a deflector for the water inletted between the valve member and valve seat, and as an enlarged contact member engageable by the poultry when drinking from the cup.

According to a still further feature, a wall of the cup is extended outwardly to form a sleeve whose interior communicates with the interior of the cup. The valve assembly includes an outer valve body received within the sleeve with the valve operator disposed within the cup, such that the cup may be removed from the outer valve body without shutting-off the water supply or disconnecting the valve assembly from the water supply line.

BRIEF DESCRIPTION OF THE DRAWINGS

The invention is herein described, by way of example only, with reference to the accompanying drawings wherein:

FIGS. 4 and 5 are longitudinal and transverse sectional views, respectively, of the poultry drinker of FIG. 3;

DESCRIPTION OF PREFERRED EMBODIMENTS

Figure 1:
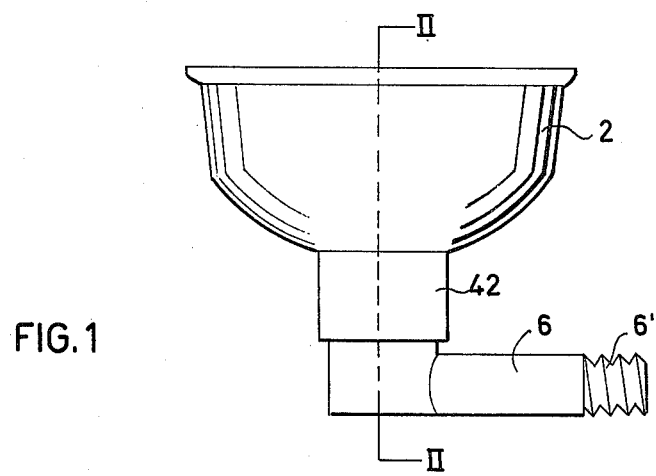
FIG. 1 is a side elevational view of one form of poultry watering devices constructed in accordance with the invention.

The poultry watering device illustrated in FIGS. 1 and 2 of the drawings comprises an open-top cup 2 for receiving water from the water supply line, and a valve assembly, generally designated 4, having a valve operator, as will be described more particularly below, disposed within the cup for periodically admitting water into the cup from the water supply line. The device further includes mounting means 6 in the form of a tube fixed to the valve assembly 4 for mounting the device to a support, such as to a water supply line supported on or adjacent to the poultry cage. Preferably, mounting tube 6 is intergrally formed with, and at right angles to a valve body 8 forming part of the valve assembly 4, and includes external threads 6' at its outer end for threading into the water supply line (not shown).

Valve body 8 of the valve assembly is of cylindrical configuration and defines an internal cylindrical chamber 10 communicating with the right-angle mounting tube 6. The bottom of the valve body 8 is closed by a wall 12 thereby directing the water flowing through the mounting tube 6 to chamber 10.

The inner end of valve body 8 is internally threaded, as shown at 14, for receiving an externally threaded cap 16. The outer face of cap 16 is preferably formed with a plurality (e.g., four) finger-gripping ribs 18 to facilitate rotation of cap 16 when applying same to the upper end of the valve body 8. An annular sealing ring 20 is interposed between the inner face of valve body 8 and the confronting inner face of cap 16.

Cap 16 is formed with a central aperture 22 for receiving a valve operator stem 24. Stem 24 is of a smaller outer diameter than aperture 22 so as to provide a flow pathway around the stem. The inner face of cap 16 is formed with an axially-extending annular shoulder 26 circumscribing aperture 22.

Annular shoulder 26 constitutes an annular valve seat cooperable with a valve member 28 for controlling the flow of water from chamber 10 into the interior of cup 2. Valve member 28 is in the form of a sealing plug of natural or synthetic elastomeric material formed with a blind bore in its inner end for receiving the inner end of the valve operator stem 24. For this purpose, the inner end of stem 24 may be formed with an annular recess 30, and the inner end of the bore through plug 28 may be of reduced diameter, to enable the plug to firmly grip the inner end of the stem.

The outer end of the valve operator stem 24 is formed with a conical shroud 32. This shroud serves several purposes: Thus, it provides a shoulder for receiving a coil spring, schematically shown at 34 between it and a recess 36 in the outer face of cap 16, which spring urges stem 24 vertically outwardly, and thereby urges resilient plug 28 into sealing engagement with the annular valve seat 26 to normally maintain the valve closed. In addition, annular shroud 32 serves to deflect the water inletted between the valve seat 26 and the resilient plug 28 when the valve operator stem 24 is tilted by the poultry drinking water through the open top of cup 2. Further, this shroud serves as a contact member engageable by the poultry when drinking from the cup, at any side thereof, to replenish the cup with water, as will be described more particularly below.

The valve body 8 is mounted within a central opening 40 in cup 2. For this purpose, cup 2 is formed with a depending cylindrical extension 42 dimensioned so as to receive, with a press-fit, the outer cylindrical surface of the valve body 8. A seal is effected between the two by means of an annular sealing ring 44 received within an annular groove in valve body 8. In addition, opening 40 through the cup is circumscribed by an annular shoulder 46 at the juncture with the cylindrical extension 42. Shoulder 46 is engageable by the inner end of the valve body 8 for fixing the position of the cup on the valve body.

The illustrated poultry watering device operates in the following manner:

Spring 34 normally urges the valve operator stem 24 in the outer direction, thereby normally maintaining the stem in a vertical position, with the resilient plug 28 carried at its inner end engageable with the valve seat 26 around the complete periphery thereof, thereby preventing the flow of water into the interior of cup 2. The valve stem 24 is similarly biased in the outer direction by the pressure of the water when introduced into the interior chamber 10 of the valve body 8 via the right-angle mounting tube 6.

In order to initially fill the cup 2, the valve operator 24 is manually tilted by engaging the conical shroud 32 at the outer end of stem 24. This unseats the resilient plug 28 from one side of the annular valve seat 26, thereby permitting the water to flow into cup 2 through the aperture 22 in cap 16. This water, being under pressure, impinges against the inner face of the conical shroud 32, which shroud thereby prevents the water from jetting outwardly and deflects it back to the bottom of the cup.

When a predetermined level of water has been reached within the cup, e.g., just below the top of the conical shroud 32, the shroud at the outer end of the valve operator stem 24 is released. This permits the resilient plug 28, under the influence of the inlet water pressure as well as of spring 34, to engage the complete periphery of an annular valve seat 26, thereby terminating the flow of water into the cup.

Now, as a fowl drinks from the top of the cup, its beak will continuously contact the conical shroud 32, thereby tilting the valve operator stem 24 and permitting water to enter the cup through the space formed at one side between plug 28 and the annular valve seat 26.

The level of the water within the cup is somewhat self-regulating. Thus, if the level rises too high, e.g., above the top of shroud 32, the fowl will not contact it when drinking; and if it falls too low below the top of shroud 32, the fowl will tend to make more contact with the shroud when drinking the water from the cup.

A very important advantage in the illustrated construction is that it permits the cup to be removed from the device in a simple and convenient manner without shutting-off the water supply or disconnecting the valve assembly 4 from the water supply line. Thus, to remove cup 2 for cleaning purposes, it is only necessary to slide it off the top of the valve body 8. The water pressure in the line is still applied against the resilient plug 28 urging it into contact with the annular valve 26 thereby closing the valve; and even in the absence of pressure in the line, spring 34 also performs the same function. Thus, the cup 2 may be quickly and conveniently removed whenever it is desired, for cleaning or other purposes, without disconnecting or dismantling any other parts or shutting-off the water supply line.

Another advantage in the illustrated arrangement is that all the parts are of very simple construction which can be produced of plastics materials (except for spring 34) according to high-volume low-cost manufacturing techniques, e.g., by injection molding. In addition, these parts can be assembled and disassembled in a simple manner.

Figure 2:
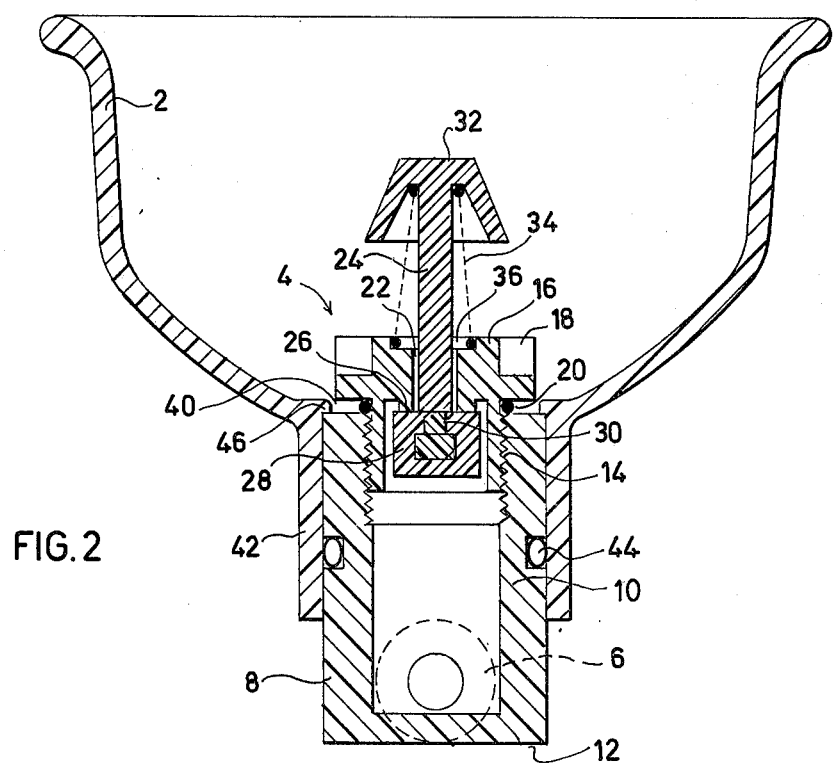
FIG. 2 is a sectional view along lines II—II of FIG. 1.
Figure 3:
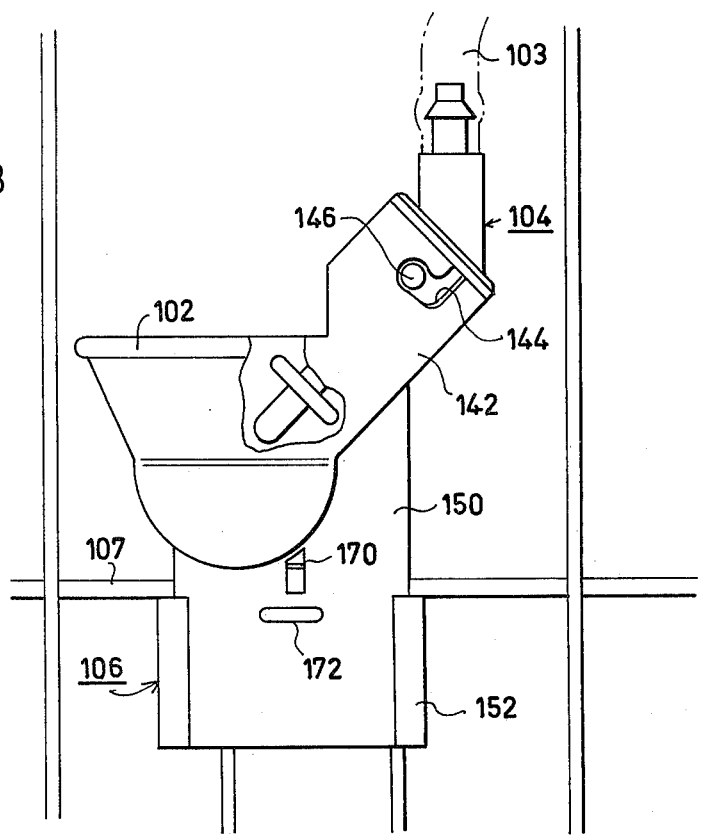
FIG. 3 is a side elevational view illustrating another poultry watering device constructed in accordance with the invention.

The poultry watering device illustrated in FIGS. 3–6 also comprises, as in FIGS. 1 and 2, an open-top cut 102 for receiving water from the water supply line, 103; a valve assembly 104 having a valve operator disposed within the cup for periodically admitting water into the cup from the water supply line; and mounting means 106 for mounting the device to a support which, in the case of FIG. 3, is the poultry cage 107 itself.

Figure 5:
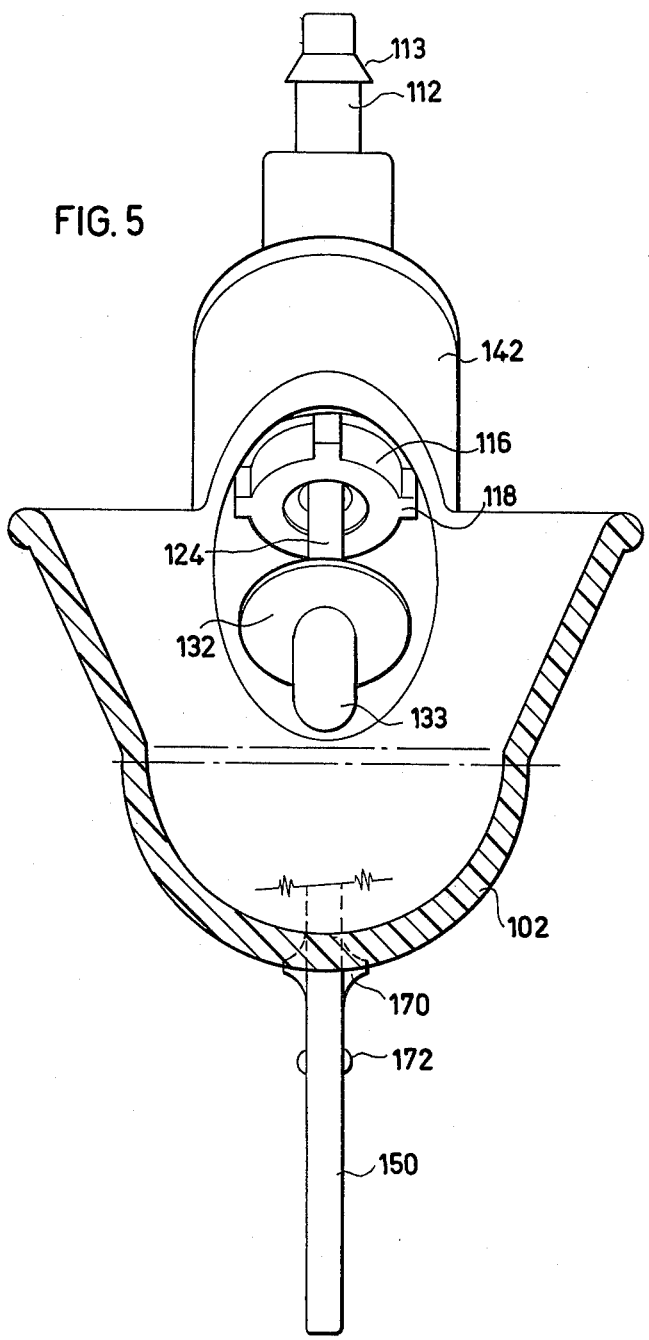
Figure 6:
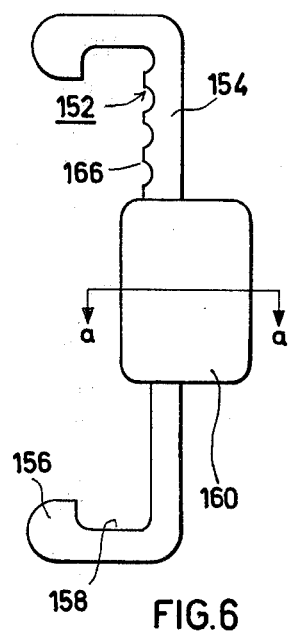
FIG. 6 is a top view of the mounting bracket of the poultry drinker of FIG. 3, FIG. 6a being a sectional view along lines a—a of FIG. 6.

As shown particularly in FIG. 4, the valve assembly 104 includes a valve body 108 of outer cylindrical configuration and defining an internal cylindrical chamber 110. The end of the valve body 108 is formed with a connector 112 having an annular rib 113 for receiving the water supply tube 103 (FIG. 3) supplying water to the device. The axis of connector 112 is at an angle of about 135° with respect to the axis of the remainder of the valve body 108. Thus, the valve assembly 104 may be mounted to the cup 102 so that, with the open top of the cup facing upwardly, the connector 112 is oriented to extend either vertically as shown in FIGS. 4–6, or horizontally as show in the arrangement of FIG. 7.

The construction of the valve assembly 104 within the valve body 108 is basically the same as in FIGS. 1 and 2. Thus, one end 114 of the valve body 108 is internally threaded for receiving an externally-threaded cap 116; and the outer face of cap 116 is formed with four finger-gripping ribs 118 to facilitate rotation of the cap when applying the same to the end of the valve body. An annular sealing ring 120 is interposed between the confronting faces of valve body 108 and cap 116.

Cap 116 is formed with a central aperture 122 for receiving a valve operator stem 124, which stem is of smaller outer diameter than aperture 122 to provide a flow pathway around the stem. The outer face of cap 116 is formed with an axially-extending annular shoulder 126 circumscribing aperture 122 and constituting an annular valve seat cooperable with valve member 128 for controlling the flow of water from chamber 110 into the interior of cup 102. Valve member 128 is in the form of a sealing plug formed with a blind bore in one end for receiving the respective end of the valve operator stem 124.

The outer end of the valve operator stem 124 is formed with an annular rib 132 which serves as a shoulder for receiving a coil spring 134 urging resilient plug 128 into sealing engagement with the annular valve seat 126 to normally maintain the valve closed. In addition, annular rib 132 serves to deflect the water inletted between the valve seat 126 and the resilient plug 128 when the valve operator stem 124 is tilted by the poultry drinking water through the open top of cup 102. The outer tip 133 of stem 124 is enlarged in diameter and serves, with the annular rib 132, as a contact member engageable by the poultry when drinking from the cup, to replenish the cup's water.

The upper part of the side wall of cup 102 is extended outwardly to form a sleeve 142 of cylindrical configuration adapted to snugly receive the cylindrical body member 108 of the valve assembly 104, with the valve operator 124 extending into the interior of the cup. The axis of sleeve 142 forms an angle of about 45° with respect to the center axis of the cup. The outer end of sleeve 142 is formed with a bayonet slot 144 adapted to receive a bayonet pin 146 projecting from one side of the body member 108 of the valve assembly 104. Slot 144 and pin 146 thus define a bayonet-pin-and-socket connection facilitating the quick attachment and detachment of the cup 102 with respect to the valve assembly 104.

Figure 6A:
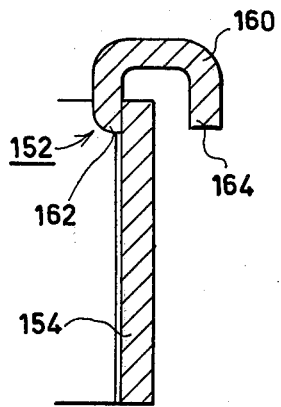

In the arrangement illustrated in FIGS. 4–6, the cup 102 carries the mounting means 106 for mounting the device, in this case directly to the poultry cage as illustrated in FIG. 3. Mounting means 106 comprises two mounting elements, namely a mounting plate 150 (best seen in FIGS. 4 and 5) integrally formed with the cup 102 and depending from its bottom, and a mounting bracket 152 (best seen in FIGS. 6 and 6a) attachable to the poultry cage.

The bracket 152 includes a plate 154 formed with inwardly-turned ends 156 at its opposite sides to define a socket 158 equal to the width and thickness of plate 150 for snugly receiving the plate therein. In addition, bracket 152 includes, at its upper end, a hook 160 having one end 162 secured to bracket plate 154, and the opposite end 164 turned inwardly for receiving a horizontal wire of the poultry cage 107 to which the device is to be attached. One half of the inner face of bracket plate 154 is formed with semi-cylindrical recesses 166, as best seen in FIG. 6, for selectively receiving a vertical wire of the poultry cage, thereby to securely mount the bracket to the cage.

The mounting plate 150 integrally formed with cup 102 is of a width and thickness so as to snugly fit within the socket 158 of bracket 152. In addition, the upper end of plate 150 is formed with an embossment 170, and just below it, with a rib 172, both arranged so that when the plate 150 is pressed into socket 158 of the bracket 152, rib 172 rides along the outer surface of hook 160 and snaps under the hook, with the embossment 170 engaging the upper face of the hook. Plate 150, and cup 102 secured thereto, are thus both firmly retained within bracket 152. The plate further includes a closed-loop strengthening rib 174 enclosing a section 176 of reduced thickness for material-savings purposes.

The poultry watering device illustrated in FIGS. 3–6 operates substantially the same as described above regarding FIGS. 1 and 2 such that the supply of water within the cup is continuously replenished by contact of the poultry with the valve operator 124 to tilt same and to permit more water to enter the cup. The arrangement illustrated in FIGS. 3–6 also has the same advantages, in that it permits the cup to be removed from the device in a simple and convenient manner without shutting off the water supply or disconnecting the valve assembly 102 from the water supply line.

Figure 7:
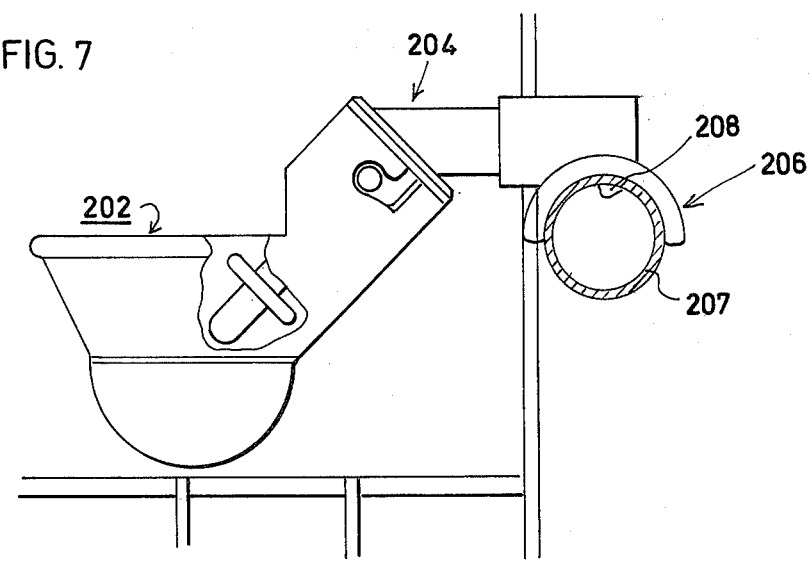
FIG. 7 is a side elevational view illustrating another poultry watering device constructed in accordance with the invention.

Another advantage in the arrangement of FIGS. 3–6 is that the connector 112 may be applied to the valve body 108 so as to extend not only vertically, as illustrated in FIGS. 3–5, but also horizontally. This is shown particulary in FIG. 7, which also illustrates another arrangement for mounting the poultry watering device, namely, directly to a water supply pipe, designated 207, rather than directly to the poultry cage as in FIGS. 3–6. Thus, in the arrangement illustrated in FIG. 7, the cup, therein designated 202, is also disposed so that its open top faces upwardly, whereas the valve assembly 204 is mounted by the same pin-and-bayonet-socket connection as described above with respect to FIGS. 3–5, but extends in a horizontal direction. In the FIG. 7 arrangement, the mounting means, generally designated 206, is a saddle-type connector carried by the end of the valve assembly 204 for mounting directly to the water supply pipe 207, the saddle 206 also including a tap 208 communicating with the interior of the water supply pipe 207 for supplying the water therefrom to the valve assembly. In all other respects, the construction and mode of operation of the poultry watering device illustrated in FIG. 7 are the same as described above.

What is claimed is:

1. A poultry watering device connectable to a water supply line and including an open-top cup receiving water from the supply line, a valve assembly having a valve operator disposed within the cup and controlling a valve member for admitting water into the cup from the water supply line, and mounting means for mounting the device to a support within the cup positioned to permit the poultry to drink water from the cup through the open top thereof; said mounting means comprising: a plate integrally formed with the cup and depending from its bottom; and a bracket including a socket for receiving said depending plate and a hook for attaching the bracket to the poultry cage; said bracket including a plurality of semi-cylindrical recesses formed on its inner face for selectively receiving a wire of the poultry cage on which the bracket is to be mounted, said hook being at the upper end of the mounting bracket, and said mounting plate including a rib on its inner face slidable over the hook and snappable under its lower face for releasably retaining the mounting plate within the socket of the mounting bracket.

2. A poultry water device connectable to a water supply line, comprising: an open-top cup receiving water from the supply line; a valve assembly having a valve operator disposed within the cup and controlling a valve member for periodically admitting water into the cup from the water supply line and mounting means for mounting the device to a support with the cup positioned to permit the poultry to drink water from the cup through the open top thereof; a wall of said cup being extended outwardly to form a sleeve whose interior communicates with the interior of the cup; said valve assembly including an outer valve body received within said sleeve with the valve operator disposed within the cup, such that the cup may be removed from the outer valve body without shutting off the water supply or disconnecting the valve assembly from the water supply line; said mounting means comprising a mounting plate integrally formed with the cup and depending from its bottom; said mounting means further comprising a bracket including a socket for receiving said depending plate, and a hook for attaching the bracket to the poultry cage.

3. The device according to claim 2, wherein said bracket includes a plurality of semi-cylindrical recesses formed on its inner face for selectively receiving a wire of the poultry cage on which the bracket is to be mounted; said hook being at the upper end of said bracket; and said mounting plate including a rib on its inner face slidable over the hook and snappable under its lower face for releasably retaining the mounting plate within the socket of said bracket.

4. The device according to claim 2, wherein said valve assembly comprises; a cap removably attached to said valve body and formed with an aperture therethrough; the inner face of said cap disposed within said valve body carrying an annular valve seat completely circumscribing said aperture; said valve operator including a stem extending through said aperture of the cap; said valve member being carried at the inner end of said stem within the valve body adjacent to said valve seat; said valve stem being of sufficiently smaller cross-sectional area than said aperture in the cap so as to permit tilting of the valve stem within the aperture to unseat the valve member from a portion of the annular valve seat and to provide a flow pathway around the stem when the stem is so tilted; and a spring urging said stem outwardly to bias the stem to its untilted position with the valve member in engagement with the complete annular surface of the valve seat.

5. The device according to claim 4, wherein said stem is formed at its outer end with an annular projection which serves as a shoulder for receiving said spring between it and said cap, as a deflector for the water inletted between the valve member and valve seat, and as an enlarged contact member engageable by the poultry when drinking from the cup.

6. A device according to claim 4, wherein said cap is threadedly attached to said valve body and is formed with finger-gripping ribs to facilitate rotation of the cap.

7. A device according to claim 4, wherein said valve member is in the form of a sealing plug having a blind bore in its inner end for receiving the inner end of the valve operator stem.

8. The device according to claim 4, wherein the axis of said sleeve forms an angle of about 45° with respect to center axis of the cup, and the outer valve body includes a connector at its outer end for connecting same to the water supply line, the axis of said connector end of the valve body being at an angle of 135° with respect to the axis of the remainder of the valve body, such that the valve body may be selectively attached to the cup sleeve with said connector end extending either vertically or horizontally, and with the open top of the cup facing upwardly.

9. The device according to claim 4, wherein said valve body and said cup sleeve include a bayonet-pin-and-socket connection facilitating quick connection and detachment of the cup with respect to the valve assembly.

* * * * *